(12) United States Patent
Li et al.

(10) Patent No.: US 8,070,209 B2
(45) Date of Patent: Dec. 6, 2011

(54) SUN VISOR

(75) Inventors: Chi Li, Farmington Hills, MI (US); John Andrew Stakoe, Bloomfield Hills, MI (US); Todd Jared Konet, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/683,510

(22) Filed: Jan. 7, 2010

(65) Prior Publication Data

US 2011/0163568 A1 Jul. 7, 2011

(51) Int. Cl.
*B60J 3/02* (2006.01)
(52) U.S. Cl. ...................................... 296/97.9
(58) Field of Classification Search ............... 296/97.9
See application file for complete search history.

(56) References Cited

U.S. PATENT DOCUMENTS

| | | |
|---|---|---|
| 4,317,589 A | 3/1982 | Kuss |
| 4,953,064 A * | 8/1990 | Viertel et al. ............... 362/492 |
| 5,031,952 A | 7/1991 | Miyamoto et al. |
| 5,466,029 A | 11/1995 | Zetterlund |
| 5,538,311 A * | 7/1996 | Fusco et al. .................. 296/97.5 |
| 5,816,642 A * | 10/1998 | Wilson ......................... 296/97.9 |
| 5,829,817 A * | 11/1998 | Ge ............................... 296/97.9 |
| 5,871,252 A * | 2/1999 | Gute ........................... 296/97.11 |
| 6,830,279 B2 * | 12/2004 | Beaver ......................... 296/97.9 |
| 7,011,354 B1 | 3/2006 | Gullickson |
| 7,093,880 B1 | 8/2006 | Tiesler |
| 7,543,880 B2 | 6/2009 | Wieczorek et al. |
| 2002/0017799 A1 * | 2/2002 | Asai et al. ..................... 296/97.9 |

FOREIGN PATENT DOCUMENTS

| | | |
|---|---|---|
| FR | 2489219 A1 | 3/1982 |
| JP | 10272924 A | 10/1998 |
| JP | 2003025839 A | 1/2003 |

* cited by examiner

*Primary Examiner* — Dennis Pedder
(74) *Attorney, Agent, or Firm* — Greg P. Brown; Brooks Kushman P.C.

(57) ABSTRACT

A sun visor assembly includes a sun visor in which the corners associated with one of the longer edges are rotatably mounted to an automotive vehicle, one corner of which is fixed and the other corner being removable from a mount affixed to the vehicle. The removable corner has a cutout with a cylindrical pin coupled to the cutout at both ends of the pin. The mount has an arcuate cradle to engage the pin over less than half of its circumference. The opening to gain access to the cradle faces generally downward when installed and the pin is held in the mount by magnetic attraction.

11 Claims, 3 Drawing Sheets

SUN VISOR

BACKGROUND

1. Technical Field

The disclosure relates to a sun visor for an automotive vehicle.

2. Background Art

Typical sun visors for automotive vehicles are fixed to the vehicle roof at one corner of the sun visor and selectably affixed to the vehicle roof at a second corner. The visor is selectably affixed by a pin attached to the visor which can be engaged into a mount permanently coupled to the vehicle roof. The mount has a hook portion into which the pin can be snapped. When the pin is snapped into the hook, the hook wraps around the pin more than half of the circumference of the pin. The hook spreads apart when a force is applied to the sun visor to disengage the pin or to engage the pin. The pin snaps back in place after the pin has moved past the opening in the hook. One of the problems with such a configuration is that the amount of effort to snap the pin in place or to release the pin depends on the manufacturing tolerance of the hook, the temperature of the hook, and the amount of wear on the hook. As the hook is often made of a polymeric material, the hook is more or less resilient depending on the temperature. At extremely cold temperatures, the amount of force necessary to disengage the pin from the hook is great. If too much force is required to disengage the pin and the hook is brittle due to low temperatures, it is possible to fracture the hook. Under high temperature conditions, the amount of force to disengage may be too little so that when a person is attempting to adjust the visor, e.g., rotate the visor between an in-use and a stowed position that the visor is pulled out of the hook. This can be an unwelcome surprise, particularly if the person is operating the vehicle. It is costly to manufacture the hook with the desired tolerances that ensures reasonable performance under the expected operating condition ranges.

The hook-and-pin type configuration presents an inconvenience to a person trying to disengage the pin because it can be disengaged in only one direction. Typically, the pin is disengaged by pulling on the visor in a direction away from the windshield, i.e., toward the person pulling on the visor. Because it disengages in only one direction, or a small range of angles, it can be difficult for the person trying to disengage the visor to be successful, unless looking at the visor while trying to disengage the visor, which may not be possible if the person is operating the vehicle. The problem is likely exacerbated for a person of short stature or one who adjusts their seat farther from the windshield.

One of the reasons to have one of the attachment points of the sun visor being disengageable is to provide flexibility in blocking out the sun both in front of the person and to the side of the person. The other reason to provide such flexibility is that under certain, unusual circumstances, objects may be accelerated within the vehicle and impact the sun visor. To reduce damage to such objects that may be contacting the sun visor and to avoid snapping off the hook of the sun visor due to the impact, it may be desirable for the sun visor to disengage toward the front. Thus, the hooks of future sun visor systems may have the opening to the hook facing toward the windshield so that in such unusual circumstances of high acceleration when an object from the cabin may be accelerated toward the windshield, the pin of the visor disengages to allow the visor to move freely. Although such configuration of the hook is desirable under such unusual circumstances, this configuration is even more difficult for a person to operate. In releasing the pin from the hook in a direction away from the cabin, the person is likely to smash the sun visor into the windshield, possibly lightly pinching a finger or rapping a knuckle on the windshield in the process. Furthermore, by requiring the sun visor to move away from the person to allow disengagement, it may preclude smaller persons from being able to disengage the sun visor unless they are unbelted and the car is not moving.

Yet another disadvantage is that if a clearance between the pin and the hook develops or if such a clearance exists upon manufacture, the pin can rattle in the hook leading to undesirable cabin noise. Or, if the hook is too tight, the pin may squeak in the hook.

SUMMARY

A sun visor assembly includes a generally flat sun visor with two longer edges. One of the longer edges is flexibly mounted to a roof of a vehicle. A first corner associated with the longer edge is rotatably affixed to the roof. The visor has a cutout proximate a second corner associated with the longer edge. The visor has a cylindrical pin coupled to the cutout at both ends of the pin. The assembly includes a mount affixed to the roof. The mount has an arcuate opening to engage the pin. When the pin is installed in the mount, the mount engages the pin over less than half of its circumference. The opening faces generally downward when installed and the pin is held in the mount by magnetic attraction. Alternative embodiments include: the mount having a magnet and the pin being of a ferromagnetic material, the mount having a piece of ferromagnetic material embedded within and the pin being a magnet; and the mount having a magnet embedded within and the pin being a magnet. In the last embodiment listed, the polarity of the two magnets are aligned so that they are attracted as they are brought in proximity.

The pin can be wholly made of a magnet or of a ferromagnetic material. Or, in one embodiment, the pin has a core of the magnet or ferromagnetic material, but is covered with another material such as a polymeric material. The piece in the base that is either a magnet or a ferromagnetic material is, in one embodiment, embedded in the base (or mount) such that it is covered with the parent material of the base, a polymeric material in one example. In one alternative, the piece in the base forms the cradle with the pin riding on the cradle. In another alternative, the piece is shaped similar to the surface of the cradle, but with a slightly larger diameter. The piece is embedded in the base, but just below the surface.

By using magnetic force to retain the sun visor, the performance of the retention system is largely unaffected by temperature. This presents an advantage over a hook-and-pin system in which pin engagement is affected by the properties of the pin at the temperature in the cabin of the vehicle.

Yet another advantage, according to the present disclosure, is that the sun visor can be disengaged in a broader range of directions than a hook-and-pin system. Furthermore, with the magnetic system, the sun visor can be disengaged at a downward angle. This presents an advantage, particularly to persons of shorter stature. The hook-and-pin system for sun visor retention typically releases toward the passenger. However, in systems that release toward the windshield so that the visor is disengaged when an object impacts the visor from the cabin of the vehicle, it may be common for the person attempting to disengage the visor to rap a knuckle into the windshield. The magnetic system, according to the present disclosure, is preferable in that with a downward disengagement, the visor is more readily disengaged and with less risk of bumping a knuckle into the windshield in the process. And, depending on the opening of the mount system, the visor is readily disengaged in the event of an object accelerating toward the visor from the cabin of the vehicle.

Retention of the pin of the sun visor by magnetic attraction presents an advantage over a hook-and-pin system because the manufacturing tolerances are much less strict since the former relies on magnetic attraction. Magnetic attraction is not strongly affected by temperature, whereas, the hook-and-pin system relies on the hook stiffness retaining the pin, which is affected by temperature. Also, because the magnetic system's performance is less affected by manufacturing tolerances and temperature differences, the magnetic system is not plagued by a too loose or too tight fit either causing vibration, if too loose, or squeaking, if too tight. Instead, a magnetic retention system is largely impervious to rattling because the pin and cradle stay in contact with each other, except in a high acceleration event, in which case, it is desirable for the sun visor to become disengaged.

Also disclosed is a method to manufacture a base for a sun visor in which the base is molded. The base has a fastener extending from a first surface of the base, an arcuate cradle extending from a second surface of the base, and a metallic piece molded within the base. The metallic piece is one of a magnetized ferrometallic material and a non-magnetized ferrometallic material and the piece is located proximate the cradle. The cradle extends from the base in a direction roughly opposite a direction that the fastener protrudes from the base. A surface of the cradle forms a portion of a cylinder which is greater than 100 degrees and less than 180 degrees of the circumference of the cradle. The cradle is adapted to mate with a pin coupled to the sun visor. In one embodiment, the metallic piece is exposed and forms at least a portion of a surface of the cradle. In an alternate embodiment, the metallic piece is below a surface of the cradle, in which case the surface of the cradle is formed in the parent material of the base.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. For example, the sun visor is described as being mounted in an automotive vehicle. However, the sun visor can be used in any type of vehicle, which provides a mounting surface, e.g., boats, tractors, trucks, recreational vehicles, and off-road vehicles. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
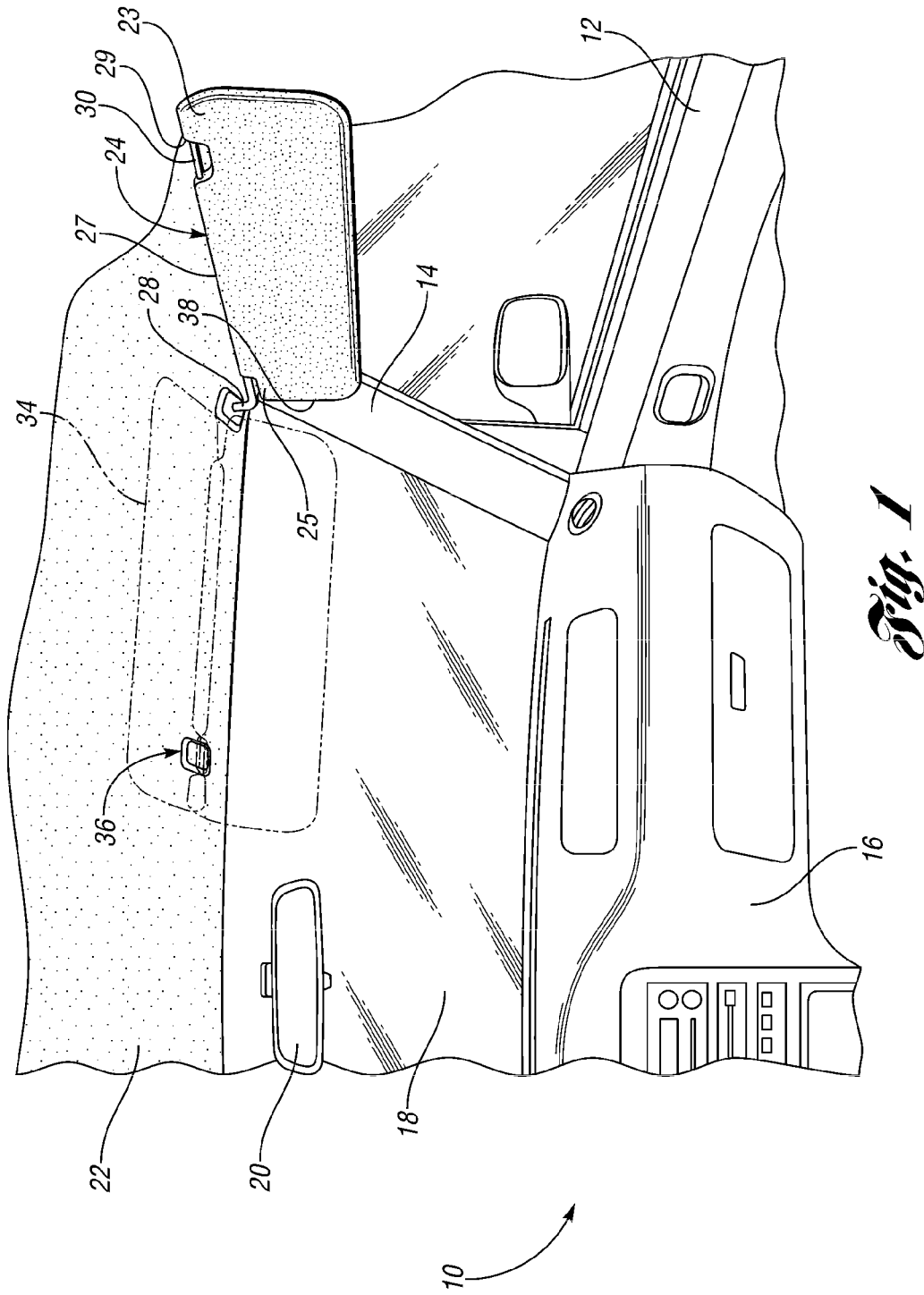
FIG. 1 illustrates a portion of a vehicle showing a sun visor.

In FIG. 1, a portion of a vehicle 10 is shown. The passenger door 12 (in left hand drive vehicles), an A-pillar 14, a dashboard 16, and a windshield 18 are shown as they meet near a corner of a cabin of the vehicle. A rearview mirror 20 is located near the middle of the front of the cabin. A portion of a headliner 22 is also shown. In FIG. 1, a sun visor 24 is shown in a side, in-use position to intercept sun rays coming in through a side window of vehicle 10. Sun visor 24 is generally flat and shaped roughly as a quadrilateral having four corners. Sun visor 24 is rotatably mounted through headliner 22 to the roof of vehicle 10 via pivot rod 28 Pivot rod 28 is coupled to one longer edge 27 of sun visor 24 at a first corner 23. Sun visor 24 has a D-ring which includes a cutout 29 and a pin 30 located near a second corner 25 associated with the one longer edge 27. Sun visor 24 is fixed to vehicle 10 only via pivot rod 28 as shown in FIG. 1, but can be rotated with respect to pivot rod 28 to assume a front, in-use position 32 or a stowed position 34. In the front, in-use position 32 or stowed position 34, pin 30 couples with a center mount 36 (alternatively called a base or a mount herein). Pin 30 engages with mount 36 so that sun visor 24 can rotate generally around an axis parallel to the one longer edge. When pin 30 is disengaged from mount 36, sun visor 24 can rotate additionally around an axis roughly parallel with a short edge 38 of sun visor 24.

In FIG. 1, mount 36 is proximate headliner 22. As will be shown in FIG. 2, mount 36 is affixed through headliner 22 to a support member. Pivot rod 28 can be mounted through headliner 22 to the same support member. Alternatively, the pivot rod can be mounted to A pillar 14, which can serve as a second support member.

Figure 2:
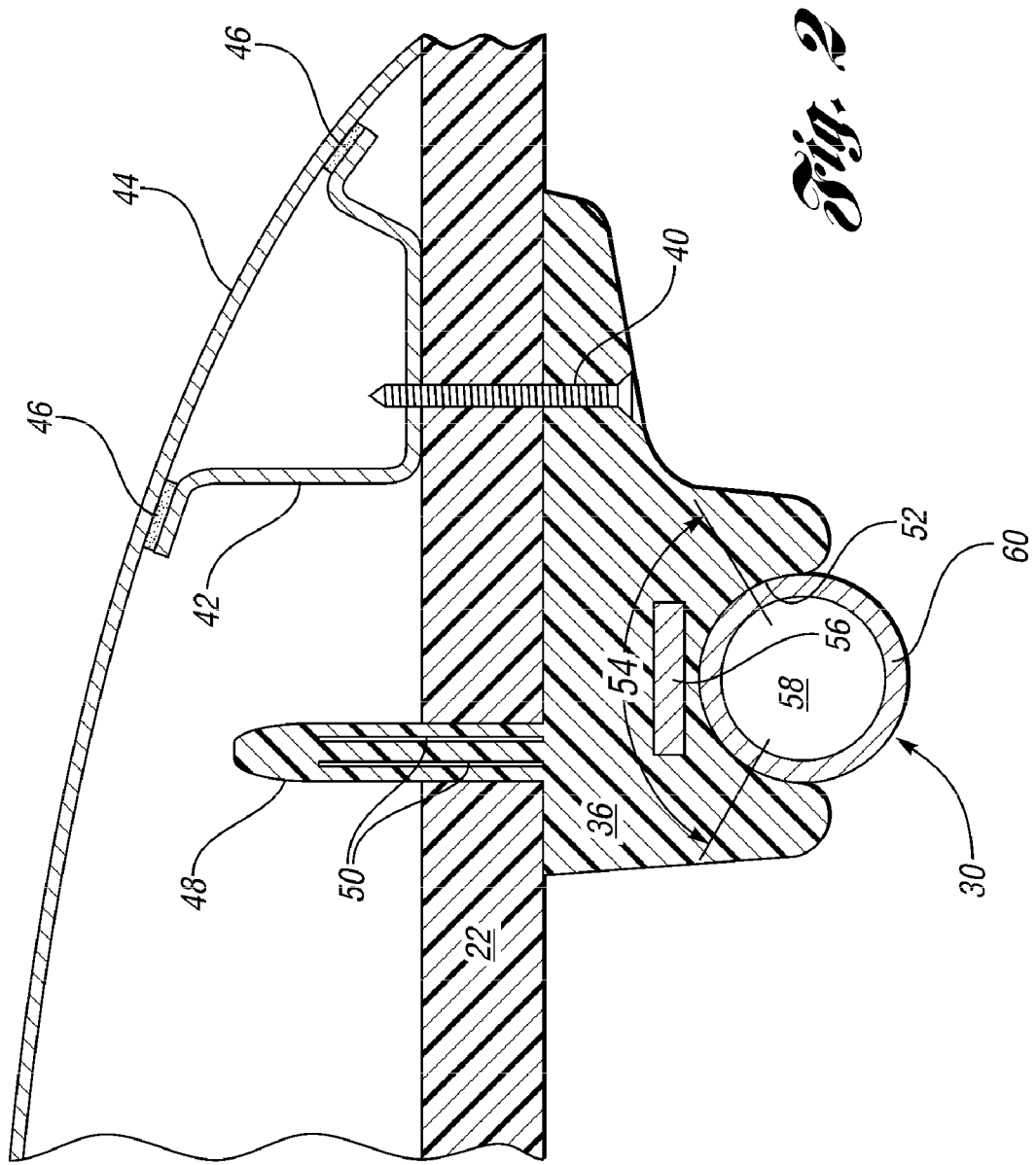
FIG. 2 is a cross section of a mount and a pin system illustrating an embodiment of the disclosure.

A detail of mount 36 and pin 30 are shown in cross section in FIG. 2. Mount 36 is coupled through headliner 22 via a self-tapping screw 40 into a beam 42, which serves as a support member for mount 36. Beam 42 may be adhered to roof 44 by adhesive 46. Mount 36 is located via a fastener 48. Fastener 48 has lengthwise slits 50 which allow fastener 48 to crush to travel through an orifice of slightly smaller inside diameter than the outside diameter of uncrushed fastener 48. When fastener 48 clears the orifice, fastener 48 pops back to the original diameter so that fastener 48 secures mount 36 to headliner 22. A portion of mount 36 forms a cradle 52 which is shaped to accept pin 30. Cradle 52 contacts pin 30, when engaged, over less than half of the circumference of pin 30, indicated by angle 54 in FIG. 4. Angle 54 is in the range of 100 to 180 degrees, exclusive. An opening in mount 36 leading to cradle 52 is configured such that if pin 30 and mount 36 were made of conventional materials, pin 30 would fall out of cradle 52 as installed because the opening faces downward. In the prior art, the pin is held in place by a hook, which has an opening in a sideways position, typically, not a downward position. Furthermore, the hook contacts the pin over more than 180 degrees of the circumference to lock the pin in place. A retention force is provided, according to an embodiment of the present disclosure, by magnetic force. A piece 56 is embedded in mount 36 proximate cradle 52. In one embodiment, the piece 56 is a magnetized ferromagnetic material (called a magnet herein); in another embodiment, piece 56 is a ferromagnetic material, a substantially non-magnetized material, but one which is attracted by a magnet. Pin 30 includes a core 58 of either a magnet or a ferromagnetic material. Herein, ferromagnetic material is non-magnetic, unless specifically stated otherwise. Either one or both of the mount 36 and pin 30 include magnets. In the event that both include magnets, the polarities of the magnets are arranged so that the two attract, rather than repel, each other. In one embodiment, piece 56 is of rectangular cross section and embedded in mount 36. Alternatively, piece 56 forms the inside surface of cradle 52 such that pin 30 contacts piece 56. In yet another alternative, piece 56 is formed into a shape similar to, but slightly larger in diameter than the surface of cradle 52 and is embedded in mount 36, but just below the surface of cradle 52. Pin 30 has a core 58 made of a magnet or a ferromagnetic material with a covering 60 of a polymeric or other material. Alternatively, pin 30 has no covering 60 with the magnet or ferromagnetic material core 58 directly riding on cradle 52. In yet another alternative, pin 30 is hollow and has no core. In such embodiment, cylinder 60 is a magnet or a ferromagnetic material.

The embodiment shown in FIG. 2 has mount 36 with a fastener 48 extending generally upwardly and cradle 52 extending generally downwardly, such that fastener 48 and cradle 52 extend from mount 36 in substantially opposite directions with respect to mount 36. However, this is not intended to be limiting. Mount 36 may be applied to a more vertically oriented surface, in which case fastener 48 fixing mount 36 to the surface extends from mount 36 out of a first surface and cradle 52 extends from a second surface of mount 36 with the first surface being adjacent the second surface.

Figure 3:
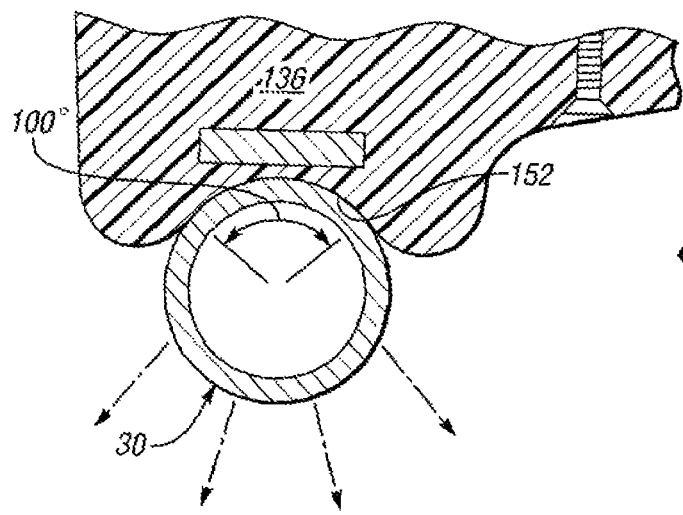
FIG. 3 illustrates a mounting system with a cradle engaging with a pin over 100 degrees of the circumference of the pin.
Figure 4:
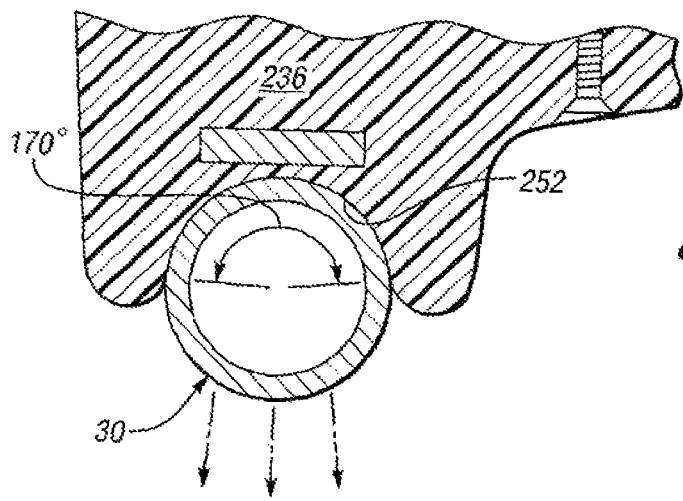
FIG. 4 illustrates a mounting system with a cradle engaging with a pin over 170 degrees of the circumference of the pin.
Figure 5:
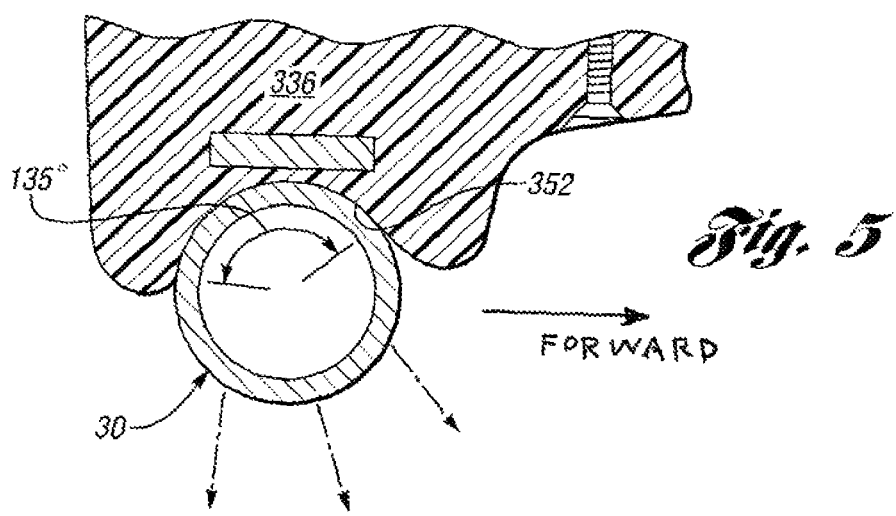
FIG. 5 illustrates a mounting system in which the opening to the cradle is located more toward the front.

Illustrated in FIGS. 3-5, pin 30 can be removed from cradle 152, 252, and 352 in a plurality of directions, depending on the portion of the circumference of pin 30 which engages with the cradle. In FIGS. 3 and 4, the opening to cradle 152, 252 is shown generally facing downward. However, by displacing the opening to cradle 352 of FIG. 5 toward the front of the vehicle (or, alternatively, the rear of the vehicle, not shown, depending on how mount 336 is installed in a vehicle), an asymmetrical range in the directions at which pin 30 can be readily disengaged from mount 36 can be provided.

Arrows are shown in FIGS. 3-5 showing the directions in which a visor coupled to pin 30 can be pulled to remove pin 30 from mount 136, 236, 336 directly. However, the actual range is greater than that shown in FIGS. 3-5 when the tips of cradle 152, 252, 352 are somewhat flexible, e.g., made of a polymeric material. Also, once the magnetic attraction between pin 30 and mount 36 is broken, the pin can slightly ascend the tip before moving at a wider angle than shown in FIGS. 3-5.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A sun visor assembly for a vehicle, comprising:
    a generally flat sun visor having corners, a first corner adapted to be rotatably affixed to a first support member, the visor defining a cutout proximate a second corner, the visor having a cylindrical pin coupled to the visor at both ends of the cutout; and
    a mount adapted to be affixed to a second support member surface and having an arcuate cradle to engage the pin and a first magnet adjacent a pin-engaging surface of the cradle, an opening of the cradle oriented downward and toward a front of the vehicle when affixed to the second support member surface, wherein when the pin is cradled in the mount, the mount engages the pin over less than half of its circumference, and the pin is held in the mount by magnetic attraction between the pin and the first magnet, a retention force provided by the magnetic attraction having a level to allow the pin to disengage forwardly from the cradle when the visor is urged toward the front of the vehicle.

2. The sun visor of claim 1 wherein the magnet has a rectangular cross section.

3. The sun visor of claim 1 wherein the pin comprises a second magnet, and polarities of the first magnet and the second magnet are aligned to attract when the second magnet associated with the visor is proximate the first magnet associated with the mount.

4. The sun visor of claim 1 wherein the cradle engages with the pin less than 180 degrees and greater than 100 degrees of the circumference of the pin.

5. A sun visor retention system for a vehicle, comprising:
    a cylindrical pin coupled to a sun visor and composed at least partially of a ferromagnetic material; and
    a base having a fastener adapted to couple to a support member of the vehicle, an arcuate cradle to mate with the pin and having an opening oriented downward and toward a front of the vehicle when coupled to the support member, wherein a pin-contacting surface of the cradle engages the pin over less than half of a circumference of the pin, and a magnet is embedded in the base beneath the pin-contacting surface of the cradle.

6. The system of claim 5 wherein the pin is comprised of a pin magnet and magnetic attraction between the magnet in the base and the pin magnet is sufficient to retain the sun visor.

7. The system of claim 5 wherein the cradle surrounds the pin greater than 100 and less than 180 degrees of the circumference of the pin.

8. The system of claim 5 wherein the pin is comprised of a core of metallic material covered by a polymeric material.

9. The system of claim 5 wherein the base is comprised of molded polymeric material having the magnet molded in.

10. The system of claim 5 wherein the pin is selectably retained by the base, the pin is retained by magnetic attraction when the pin is brought sufficiently close to the base and the pin is released from the base when a sufficient force is applied to the sun visor to overcome the magnetic attraction.

11. A method for providing a sun visor in a vehicle comprising:
    mounting a first corner of a sun visor to a support member of the vehicle adjacent a roof, the sun visor having a pin adjacent a second corner, the pin being formed at least partially of a ferromagnetic material;
    molding a base having an arcuate cradle with a pin-engaging surface of less than 180 degrees and a piece formed of a magnetized ferromagnetic material molded into the base;
    installing the base in an interior of the vehicle adjacent a headliner such that an opening of the cradle is oriented forward and downward relative to the vehicle, such the pin may be inserted into the opening to engage with the pin-engaging surface and held therein by magnetic attraction.

* * * * *